United States Patent
Li (10) Patent No.: US 9,604,631 B2
(45) Date of Patent: Mar. 28, 2017

(54) HYBRID VEHICLE AND AIR-CONDITIONING SYSTEM THEREOF

(71) Applicants: ZHEJIANG GEELY AUTOMOBILE RESEARCH INSTITUTE CO., LTD, Taizhou (CN); ZHEJIANG GEELY HOLDING GROUP CO., LTD, Hangzhou (CN)

(72) Inventor: Shufu Li, Hangzhou (CN)

(73) Assignees: Zhejiang Geely Automotive Reseach Institute Co. Ltd., Taizhou (CN); Zhejiang Geely Holding Group Co., Ltd., Hangzhou (CN)

( * ) Notice: Subject to any disclaimer, the term of this patent is extended or adjusted under 35 U.S.C. 154(b) by 0 days.

(21) Appl. No.: 15/110,562

(22) PCT Filed: Dec. 23, 2014

(86) PCT No.: PCT/CN2014/094692
§ 371 (c)(1),
(2) Date: Jul. 8, 2016

(87) PCT Pub. No.: WO2015/103924
PCT Pub. Date: Jul. 16, 2015

(65) Prior Publication Data
US 2016/0339900 A1 Nov. 24, 2016

(30) Foreign Application Priority Data
Jan. 9, 2014 (CN) .......................... 2014 1 0010869

(51) Int. Cl.
*B60H 1/00* (2006.01)
*B60W 20/10* (2016.01)
(Continued)

(52) U.S. Cl.
CPC ............. *B60W 20/10* (2013.01); *B60H 1/004* (2013.01); *B60H 1/00885* (2013.01);
(Continued)

(58) Field of Classification Search
CPC ...... B60W 20/10; B60W 10/06; B60W 10/30; B60W 10/08; B60K 6/46; B60K 6/22;
(Continued)

(56) References Cited

U.S. PATENT DOCUMENTS 6,213,233 B1 * 4/2001 Sonntag ................. B60H 1/004
123/142.5 R
6,484,830 B1 * 11/2002 Gruenwald .............. B60K 6/28
180/65.245

(Continued)

FOREIGN PATENT DOCUMENTS

CN 1727814 B 2/2006
CN 1899863 A 1/2007
(Continued)

OTHER PUBLICATIONS

International Search Report of the International Searching Authority and Written Opinion for Application No. PCT/CN2014/094692, dated Mar. 24, 2015.

*Primary Examiner* — Michael J Zanelli
(74) *Attorney, Agent, or Firm* — Alston & Bird LLP (57) ABSTRACT

A hybrid vehicle and an air-conditioning system thereof. A heating part of the air-conditioning system may be provided with an electric heating device (120, 220) and a water heating device (130, 230), the electric heating device (120, 220) is turned on and the water heating device (130, 230) is turned off when the temperature of engine cooling water is lower than a preset temperature threshold, and the electric heating device (120, 220) is turned off and the water heating device (130, 230) is turned on when the temperature is
(Continued)

higher than the preset temperature threshold. A refrigerating part of the air-conditioning system may comprise a mechanical compressor and selected auxiliary power units (20) as a portion of a plurality of auxiliary power units, and when cold air flow needs to be supplied, an air-conditioning controller (110, 210) sends an enabling instruction to a power controller (61) to control the selected auxiliary power units (20) to enter a forced working mode. The air-conditioning system of the present invention can rapidly supply heat while reducing electricity consumption of a whole vehicle, and can also achieve good refrigerating effects in low cost and reduce energy consumption. The air-conditioning system according to the present invention is especially suitable for a series hybrid vehicle with a plurality of auxiliary power units.

11 Claims, 1 Drawing Sheet

(51) Int. Cl.
| | | |
|---|---|---|
| *B60H 1/03* | (2006.01) | |
| *B60K 6/46* | (2007.10) | |
| *B60K 6/22* | (2007.10) | |
| *B60W 10/06* | (2006.01) | |
| *B60W 10/30* | (2006.01) | |
| *B60W 10/08* | (2006.01) | |

(52) U.S. Cl.
CPC ............... *B60H 1/034* (2013.01); *B60K 6/22* (2013.01); *B60K 6/46* (2013.01); *B60W 10/06* (2013.01); *B60W 10/08* (2013.01); *B60W 10/30* (2013.01); *B60H 2001/00949* (2013.01); *B60W 2710/305* (2013.01); *B60Y 2200/92* (2013.01); *B60Y 2300/43* (2013.01); *B60Y 2300/51* (2013.01); *B60Y 2400/88* (2013.01); *Y10S 903/904* (2013.01); *Y10S 903/93* (2013.01)

(58) Field of Classification Search
CPC .... B60H 1/00885; B60H 1/004; B60H 1/034; B60H 2001/00949; B60Y 2300/43; B60Y 2400/88; Y10S 903/93; B60L 11/02
See application file for complete search history.

(56) References Cited

U.S. PATENT DOCUMENTS

| | | | |
|---|---|---|---|
| 6,748,750 B2 | 6/2004 | Choi | |
| 8,047,274 B2 * | 11/2011 | Oomura | B60H 1/004 165/202 |
| 2010/0187031 A1 | 7/2010 | Waszak et al. | |
| 2015/0183296 A1 * | 7/2015 | Ragazzi | B60H 1/03 219/205 |
| 2016/0052402 A1 | 2/2016 | Li | |

FOREIGN PATENT DOCUMENTS

| | | |
|---|---|---|
| CN | 202046309 U | 11/2011 |
| CN | 202145036 U | 2/2012 |
| CN | 102434310 A | 5/2012 |
| CN | 102529642 A | 7/2012 |
| CN | 102837619 A | 12/2012 |
| CN | 103213473 A | 7/2013 |
| CN | 103552459 A | 2/2014 |
| CN | 103786549 A | 5/2014 |
| JP | 2007283829 A | 11/2007 |
| JP | 2013-163496 * | 8/2013 |

* cited by examiner

HYBRID VEHICLE AND AIR-CONDITIONING SYSTEM THEREOF

FIELD OF THE INVENTION

The present invention relates to a hybrid vehicle, in particular to a series hybrid vehicle and an air-conditioning system thereof.

BACKGROUND OF THE INVENTION

A hybrid vehicle having both an internal combustion engine and an electromotor exists nowadays. The internal combustion engine provides mechanical energy by combusting fuel such as gasoline, and the mechanical energy can be used directly for driving a vehicle and can also be converted into electric energy by an electric generator for driving a vehicle or charging a power battery. The electromotor can drive the vehicle by means of the electric energy provided by the power battery or the generator. As for the hybrid vehicle, the engine can run constantly in a highest efficiency under an optimal control thereof, thereby achieving low pollution and energy conservation.

An air-conditioning system of a vehicle can regulate the air temperature in the cabin, and has an important influence on driving experience such as body comfort and the like. The air-conditioning system generally can include a refrigerating part and a heating part.

In one heating mode, the hybrid vehicle adopts a water heating device which heats air with waste heat generated when the engine of the vehicle runs. Thus, usually a heater core for heat exchange is arranged in a cooling water circulating loop of the engine to heat the air to be delivered to the cabin. In another heating mode, an electric heating device is utilized to generate heat and heat air with electric energy. As for the vehicle adopting the water heating device, especially under the condition of cold start of the vehicle, the cooling water can rise to an appropriate working temperature only after the engine runs for a long time, and passengers may stand bad experience caused by cold within this period of time. As for the vehicle adopting the electric heating device, a high-power electric heater of about 2 kw, such as a PTC heater, is usually adopted in order to achieve the warming effect required by the passengers. This electric heater can quickly heat air, but will seriously influence the endurance mileage of the whole vehicle after long-time working. In addition, the high-power electric heater consumes electricity too fast and easily leads to deep electricity loss of the power battery, so that the service life of the power battery is shortened.

The refrigerating part in the air-conditioning system generally adopts a mechanical compressor which is driven directly by the engine of the vehicle. However, the engine of the hybrid vehicle is not always in a working state. For example, for a series strong hybrid vehicle, the engine is started only when the SOC value of the power battery reaches a low threshold or when the engine needs to be forcedly started due to the power demand. For a medium or weak hybrid vehicle, an automatic stop or idle stop mode is usually set for the engine in order to save energy. In the automatic stop mode, when the vehicle is idle, the engine can automatically stop and can be automatically started after a certain time. It can realize combustion economization of the engine, but it is adverse for the operation of the compressor driven by the engine. It is possible that when the compressor needs to work, the engine serving as a driving source of the compressor does not work. Thus, in one existing solution, the engine is forced to work when the compressor needs to run. However, under some situations, particularly during the vehicle is parked, the engine works only for driving the compressor, which obviously increases the energy consumption uneconomically. In another solution, an electrically-driven or electrically/mechanically-driven compressor is provided, but the cost of the compressor is significantly higher than that of a conventional mechanical compressor.

Moreover, the present applicant proposed a power system of a series hybrid vehicle in Chinese Patent Application No. 201310467918.2, the entire contents of which are herein incorporated by reference. It will be discovered below that the present invention can achieve unexpected technical effects based on the power system of the series hybrid vehicle in the cited application.

SUMMARY OF THE INVENTION

The object of the present invention is to improve the air-conditioning system of a hybrid vehicle, especially a series hybrid vehicle.

According to one aspect of the present invention, provided is an air-conditioning system for a hybrid vehicle, which is used for supplying required hot air flow to the cabin of the hybrid vehicle. The air-conditioning system includes:
an electric heating device with an electric heating element, used for receiving electric energy from a power supply circuit of the hybrid vehicle, and converting the electric energy into heat energy by the electric heating element to heat air flow to be supplied to the cabin;
a water heating device with a heat exchange element, used for receiving circulating cooling water from a cooling loop of an engine of the hybrid vehicle, and transferring the heat of the circulating cooling water by the heat exchange element to the air flow to be supplied to the cabin;
a temperature sensor, used for detecting the cooling water temperature of the circulating cooling water; and
an air-conditioning controller, configured to selectively turn on or off the electric heating device and/or the water heating device according to the cooling water temperature detected by the temperature sensor when the hot air flow is supplied to the cabin; wherein the electric heating device is turned on and the water heating device is turned off when the cooling water temperature is lower than a preset temperature threshold, and the electric heating device is turned off and the water heating device is turned on when the cooling water temperature is higher than the preset temperature threshold.

According to another aspect of the present invention, provided is an air-conditioning system for a series hybrid vehicle, which is used for selectively supplying required hot air flow or cold air flow to the cabin of the series hybrid vehicle. The series hybrid vehicle includes a power system for driving the vehicle, and the power system includes:
a main power unit including a power battery and a traction electromotor;
a plurality of auxiliary power units, wherein each auxiliary power unit respectively and independently receives fuel from a fuel source, converts chemical energy in the fuel into electric energy and outputs the electric energy to a common current bus, and each auxiliary power unit includes an engine for converting the chemical energy in the fuel into mechanical energy and a generator for converting the mechanical energy of the engine into electric energy; and a power controller, used for controlling the engine of each of the plurality of auxiliary power units to work according to a preset control strategy;

The air-conditioning system includes:

an electric heating device with an electric heating element, used for receiving electric energy from the common current bus of the series hybrid vehicle, and converting the electric energy into heat energy by the electric heating element to heat air flow to be supplied to the cabin;

a water heating device with a heat exchange element, used for receiving circulating cooling water respectively from a corresponding plurality of cooling loops of a corresponding plurality of engines of the plurality of auxiliary power units, and transferring the heat of the circulating cooling water by the heat exchange element to the air flow to be supplied to the cabin;

temperature sensors each of which is arranged at a corresponding cooling loop, used for detecting the cooling water temperature of the circulating cooling water in the corresponding cooling loop; and an air-conditioning controller, configured to selectively turn on or off the electric heating device and/or the water heating device according to the cooling water temperature detected by the temperature sensors when the hot air flow is supplied to the cabin; wherein the water heating device is turned on and the electric heating device is turned off when the cooling water temperature in at least a preset number of cooling loops among the plurality of cooling loops reaches a preset temperature threshold, otherwise, the electric heating device is turned on.

Optionally, each of the plurality of cooling loops is respectively provided with a switch element for selectively turning on or off water supply to the water heating device; and the air-conditioning controller is further configured to control the switch elements when the water heating device is turned on, so that the water heating device only receives the circulating cooling water from the corresponding cooling loops of which the cooling water temperature reaches the preset temperature threshold.

Optionally, the air-conditioning controller is further configured to turn off the water heating device when the electric heating device is turned on.

Optionally, the preset number is one, or about one third or half of the total number of the plurality of cooling loops.

Optionally, the air-conditioning system further includes:

selected auxiliary power unit(s) which are a portion of the plurality of auxiliary power units, wherein each selected auxiliary power unit has a common working mode and a forced working mode; in the common working mode, the power controller selectively controls the engines of the selected auxiliary power units to run or stop according to the preset control strategy; in the forced working mode, the power controller controls the engines of the selected auxiliary power units to start running or constantly run without stopping; and a mechanical compressor for refrigerating, which is in mechanical transmission connection with the engines of the selected auxiliary power units and driven by the engines to run;

wherein the air-conditioning controller is further configured to send an enabling instruction to the power controller when the cold air flow needs to be supplied to the cabin; and the power controller controls the selected auxiliary power units to enter the forced working mode when receiving the enabling instruction.

Optionally, the air-conditioning controller is further configured to send a disabling instruction to the power controller when the cold air flow does not need to be supplied to the cabin; and the power controller controls the selected auxiliary power units to enter the common working mode when receiving the disabling instruction.

Optionally, the number of the portion of the plurality of auxiliary power units is one. According to yet another aspect of the present invention, provided is a series hybrid vehicle including a power system for driving the vehicle and an air-conditioning system for regulating the temperature of a cabin.

The power system includes:

a main power unit including of a power battery and a traction electromotor;

a plurality of auxiliary power units, wherein each auxiliary power unit respectively and independently receives fuel from a fuel source, converts chemical energy in the fuel into electric energy and outputs the electric energy to a common current bus, and each auxiliary power unit includes an engine for converting the chemical energy in the fuel into mechanical energy and a generator for converting the mechanical energy of the engine into electric energy; and a power controller, used for controlling the engine of each of the plurality of auxiliary power units to work according to a preset control strategy; wherein a number of the plurality of auxiliary power units are selected auxiliary power units, and each of the selected auxiliary power units has a common working mode and a forced working mode; in the common working mode, the power controller selectively controls the engines of the selected auxiliary power units to run or stop according to the preset control strategy; in the forced working mode, the power controller controls the engines of the selected auxiliary power units to start running or constantly run without stopping.

The air-conditioning system includes:

a mechanical compressor, which is in mechanical transmission connection with the engines of the selected auxiliary power units and driven by the engines to run; and an air-conditioning controller, which is configured to send an enabling instruction to the power controller when the mechanical compressor is required to work; wherein the power controller controls the selected auxiliary power units to enter the forced working mode when receiving the enabling instruction.

Optionally, the air-conditioning controller is further configured to send a disabling instruction to the power controller when the mechanical compressor is not required to work; and the power controller controls the selected auxiliary power units to enter the common working mode when receiving the disabling instruction.

Optionally, the number of the selected auxiliary power units is one.

The heating part of the air-conditioning system according to the present invention can rapidly meet the requirement of heat supply while reducing the electricity consumption of a whole vehicle, thus ensuring the endurance mileage of the vehicle, avoiding deep electricity loss of the power battery, protecting the power battery and prolonging the service life of the power battery. The refrigerating part of the air-conditioning system according to the present invention can meet the refrigerating requirement of a vehicle in time without increasing the cost, and simultaneously realize energy conservation. The air-conditioning system according to the present invention is especially suitable for a series hybrid vehicle with a plurality of auxiliary power units.

With detailed description of specific embodiments of the present invention below in combination with accompanying drawings, those skilled in the art will understand the above-mentioned and other purposes, advantages and features of the present invention better.

BRIEF DESCRIPTION OF THE DRAWINGS

Some embodiments of the present invention will be described in detail hereafter with reference to the drawings by way of examples, but not limitation. Like reference numbers throughout the drawings refer to the like or similar components or parts. In the drawings.

DETAILED DESCRIPTION OF THE EMBODIMENTS

Figure 1:
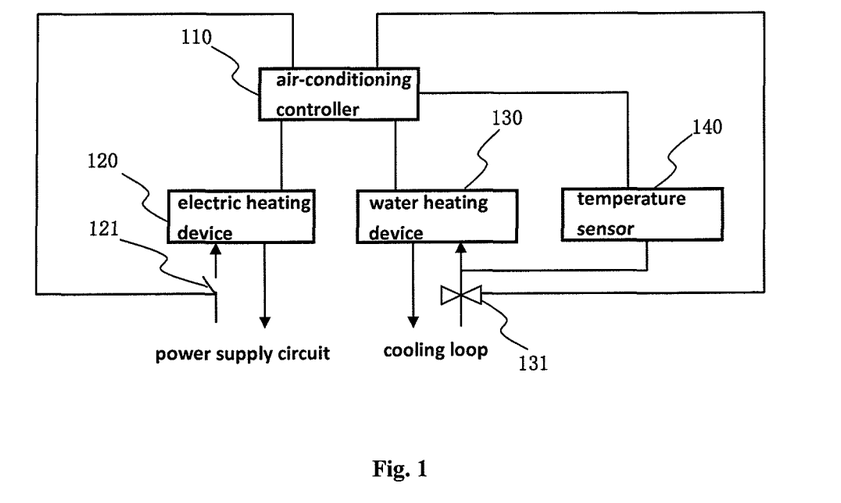
FIG. 1 is a schematic principle diagram of a heating part of an air-conditioning system for a hybrid vehicle according to one embodiment of the present invention.

FIG. 1 shows a heating part of an air-conditioning system for a hybrid vehicle according to one embodiment of the present invention, which is used for supplying required hot air flow to the cabin of the hybrid vehicle. The air-conditioning system may include an air-conditioning controller 110, an electric heating device 120, a water heating device 130 and a temperature sensor 140.

The electric heating device 120 may be provided with an electric heating element connected to a power supply circuit of the hybrid vehicle, and the electric heating element converts the electric energy from the power supply circuit into heat energy to heat air flow to be supplied to the cabin. The electric heating element, for example, may be a PTC heating element or other type of electric heating element well known by those skilled in the art. The electric heating device 120 may be provided with a switch element 121 for controlling the working state thereof, and the switch element 121 may be an electrically-controlled or electromagnetically-controlled switch for turning off or on the power supply circuit towards the electric heating element.

The water heating device 130 may receive circulating cooling water from a cooling loop of an engine of the hybrid vehicle, and a heat exchange element thereof may be connected to the cooling loop of the engine of the hybrid vehicle. When the circulating cooling water in the cooling loop flows through the heat exchange element, the heat of the circulating cooling water is transferred to air to be heated in a heat exchange mode, and then hot air flow is supplied to the cabin. The heat exchange element, for example, may be a heater core or other type of heat exchange element well known by those skilled in the art. The water heating device 130 may be provided with a switch element 131 for controlling the working state thereof. The switch element 131 may be an electromagnetic valve or other controlled valve arranged at a branch where the heat exchange element is located in the cooling loop of the engine, so as to selectively turn on or off the water supply from the cooling loop to the water heating device 130 under the control of the air-conditioning controller 110.

The temperature sensor 140 is used for detecting the cooling water temperature of the circulating cooling water in the cooling loop of the engine, and can provide the detected cooling water temperature value to the air-conditioning controller 110, so as to provide a control parameter for a control operation of the air-conditioning controller 110 as described below.

It should be understood that although it is not shown, the above-mentioned electric heating device 120 and water heating device 130 may be further respectively provided with or share other devices for supplying hot air flow to the cabin, such as a blower and the like. Respective more detailed structure and arrangement of the electric heating device 120 and the water heating device 130 are well known by those skilled in the art, and are not redundantly described herein.

When it is required to supply hot air flow to the cabin according to a manual operation (manual-operated air-conditioner) of a passenger or according to an automatic judgment (automatically-controlled air-conditioner) on air temperature in the cabin, the air-conditioning controller 110 can selectively turn on or off the electric heating device 120 and/or the water heating device 130 by means of the switch elements 121 and 131 according to the cooling water temperature detected by the temperature sensor 140. The control strategy of the air-conditioning controller 110 according to the present invention on the electric heating device 120 and the water heating device 130 based on the cooling water temperature will be described in detail below.

Specifically, when the cooling water temperature is lower than a preset temperature threshold, the air-conditioning controller 110 turns on the electric heating device 120; and when the cooling water temperature is higher than the preset temperature threshold, the air-conditioning controller 110 turns off the electric heating device 120 and turns on the water heating device 130. The preset temperature threshold may be selected to be such a cooling water temperature that the water heating device 130 can meet the requirement of heat supply to the cabin by itself alone, e.g., 80° C. or other suitable temperature. As such, when the cooling water temperature is lower than the preset temperature threshold, it indicates that the temperature of the circulating cooling water of the engine is insufficient to enable the water heating device 130 to meet the requirement of heat supply alone. Thus, the electric heating device 120 is turned on at the moment, and the heat supply demand can be rapidly met by taking the advantage of high heating speed of the electric heating device 120. When the cooling water temperature is higher than the preset temperature threshold, it indicates that the temperature of the circulating cooling water of the engine has enabled the water heating device 130 to meet the heat supply demand by itself. Thus, the electric heating device 120 is turned off at the moment, the water heating device 130 is turned on, and air is heated only by using the waste heat of the circulating cooling water. Accordingly, the electricity consumption of the whole vehicle can be immediately reduced, the endurance mileage of the vehicle is ensured, deep electricity loss of the power battery is avoided, the power battery is protected and the service life of the power battery is prolonged.

Moreover, when the cooling water temperature is lower than the preset temperature threshold, the air-conditioning controller 110 can adopt multiple control strategies for the water heating device 130. In one embodiment, when the cooling water temperature is lower than the preset temperature threshold, the water heating device 130 is turned off. At the moment, the circulating cooling water of the engine may not flow through the water heating device 130 to dissipate heat, which contributes to the rapid temperature rise of the circulating cooling water of the engine to the preset temperature threshold, thereby shortening the working time of the electric heating device 120, and reducing the electricity consumption. In another embodiment, when the cooling water temperature is lower than the preset temperature threshold, the water heating device 130 may also be kept turned on. In this case, before the temperature of the circulating cooling water rises to the preset temperature threshold, the electric heating device 120 and the water heating device 130 can simultaneously work, and air can be heated by simultaneously using the electric energy and the waste heat in the temperature rise process of the circulating cooling water. Although the air heating speed can be further increased, the temperature rise time of the circulating cooling water is prolonged, so that the electric heating device 120 needs to work for a longer time.

"Turn-on" or "turn-off" mentioned above and below should not be understood as being limited to the action of "turn-on" or "turn-off", but shall include the state of "turn-on" or "turn-off".

It should be understood that the air-conditioning system shown in FIG. 1 and the description of the air-conditioning system above merely involve the heating part of an air-conditioner, and the heating part can be used together with any existing suitable air-conditioning refrigerating part in the prior art.

The present applicant proposed a power system of a series hybrid vehicle in Chinese Patent Application No. 201310467918.2, wherein the power system adopts a plurality of independently controlled auxiliary power units (APU). Such a solution greatly reduces the power requirement for each auxiliary power unit, so that the power system is suitable for using alternative fuel with low energy density instead of traditional gasoline or diesel oil and suitable for enabling the engines in the auxiliary power units to work in a working condition region with low oil consumption and emission, thereby the emission is effectively reduced, the economization of fuel is improved, and the problem of relatively low energy conversion efficiency of the power system of the series hybrid vehicle is solved. In the present application, the applicant discovers that the air-conditioning system according to the present invention can have more obvious advantages based on the power system of the series hybrid vehicle.

Figure 2:
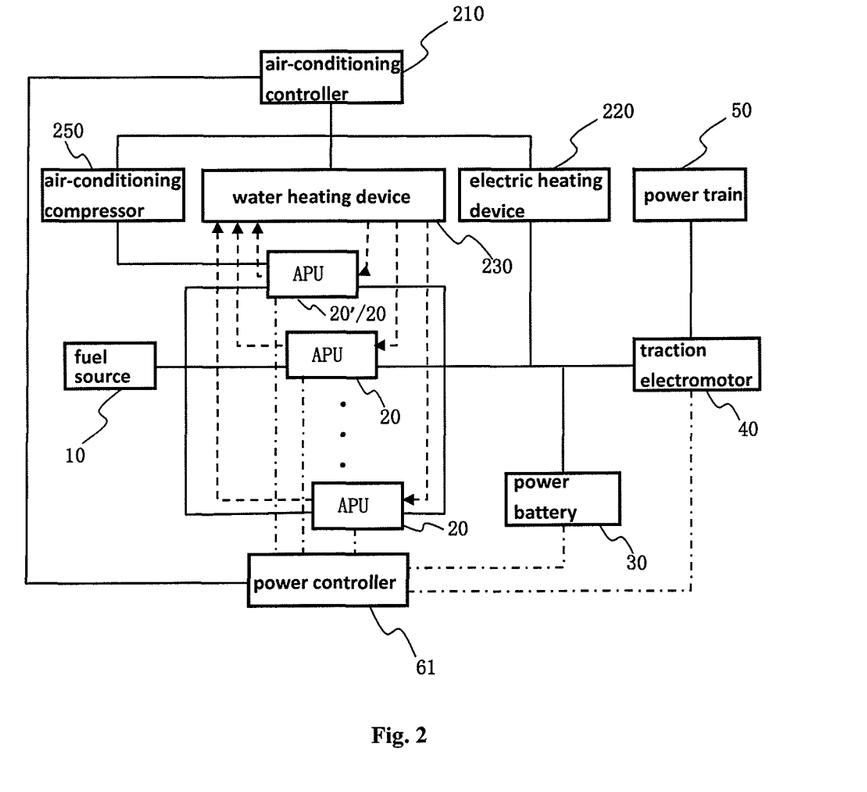
FIG. 2 illustrates an air-conditioning system according to another embodiment of the present invention, which is applied to a series hybrid vehicle with a plurality of auxiliary power units.

As shown in FIG. 2, the series hybrid vehicle may be provided with a main power unit composed of a power battery 30 and a traction electromotor 40. The power battery 30 is electrically connected to a common current bus, and receives electric energy from the common current bus for charging or discharges via the common current bus. The traction electromotor 40 is electrically connected to the common current bus, receives electric energy from the common current bus, converts the electric energy into mechanical energy and transfers the mechanical energy to a power train 50 of the vehicle, so as to drive the vehicle to run.

The series hybrid vehicle may be further provided with a plurality of auxiliary power units (APU) 20. Each auxiliary power unit 20 can respectively and independently receive fuel from a fuel source 10, convert chemical energy in the fuel into electric energy and output the electric energy to the common current bus. The number of the auxiliary power units 20 may be more than two, preferably more than three, and more preferably six or eight. The structure and the performance characteristic of each auxiliary power unit 20 may be the same. The rated power output by the auxiliary power units 20 may be selected according to the power demand of the whole vehicle and the number of the auxiliary power units, and is usually 10-30 kw, preferably 20 kw. Each auxiliary power unit 20 may include an engine for converting the chemical energy in the fuel into mechanical energy and a generator for converting the mechanical energy of the engine into electric energy (not separately shown in FIG. 2). The power of the engines can be selected according to the power demand of the corresponding auxiliary power unit 20. For example, the energy conversion efficiency of the auxiliary power unit 20 may be about 80-88%, and if the rated output power of the auxiliary power unit 20 is 18 kw, appropriate engines may be selected from the engines of which the rated output power is about 21-23 kw. The fuel provided by the fuel source 10 may be selected from a group composed of liquefied natural gas, compressed natural gas, synthetic oil, methanol, ethanol, esterified vegetable oil and dimethyl ether, and is more preferably liquefied natural gas.

A power controller 61 may control the work of the engine and the generator in each auxiliary power unit 20 as well as the power battery 30 and the traction electromotor 40 based on a preset control strategy. For clarity of illustration in FIG. 2, dot-and-dash lines express connection relations between the power controller 61 and the controlled units. The power controller 61 is preferably realized by a vehicle control unit (VCU) of the series hybrid vehicle. During the vehicle runs, the power controller 61 may respectively and independently turn on and/or turn off a certain or some auxiliary power units 20, so that the engine of each auxiliary power unit 20 can work at the optimal working condition region as much as possible, the power demand of the vehicle is well followed, and meanwhile, the problem of low energy density of alternative fuel is effectively solved by reducing the fuel consumption of unit mileage. Although not shown, the power system of the series hybrid vehicle may further include other sensors, clutches, electric conversion devices and other electric and/or mechanical elements, and for more details, reference may be made to Chinese Patent Application No. 201310467918.2 which is hereby incorporated in its entirety.

The air-conditioning system according to the present invention can be realized in the power system of the series hybrid vehicle, so that required hot air flow or cold air flow is selectively supplied to the cabin. The air-conditioning system according to one embodiment of the present invention as shown in FIG. 2, similar to that in FIG. 1, may include an air-conditioning controller 210, an electric heating device 220 and a water heating device 230. The electric heating device 220 and the water heating device 230 can be substantially the same as the electric heating device 120 and the water heating device 130 shown in FIG. 1 respectively.

In FIG. 2, dotted lines with arrows express engine cooling loops, flowing through the water heating device 230, of the auxiliary power units 20. For clarity of illustration, the temperature sensor 140 and switch elements 121 and 131 shown in FIG. 1 are not drawn in FIG. 2. However, it could be understood that the temperature sensor 140 and the switch element 131 shown in FIG. 1 may be respectively arranged in the engine cooling loop of each auxiliary power unit 20 shown in FIG. 2, and the switch element 121 shown in FIG. 1 may be arranged at the electric heating device 220 shown in FIG. 2. In this way, it could be known in combination with FIG. 1 and FIG. 2 that the temperature sensor 140 may be used for detecting the temperature of circulating cooling water in the engine cooling loop of a corresponding auxiliary power unit 20, the switch element 131 may selectively turn on or off the water supply from the engine cooling loop of the corresponding auxiliary power unit 20 to the water heating device 230 under the control of the air-conditioning controller 210, and the switch element 121 may selectively turn off or on the power supply circuit between the electric heating device 220 and a common current bus under the control of the air-conditioning controller 210.

As shown in FIG. 2, similar to the electric heating device 120 in FIG. 1, the electric heating device 220 may be connected to the common current bus of the series hybrid vehicle and receive electric energy from the common current bus, and an electric heating element in the electric heating device 220 converts the electric energy into heat energy to heat air flow to be supplied to the cabin. The electric heating element, for example, may be a PTC heating element or other type of electric heating element well known by those skilled in the art.

Different from the water heating device 130 in FIG. 1, the water heating device 230 in FIG. 2 separately receives circulating cooling water from a corresponding plurality of cooling loops of a corresponding plurality of engines of the plurality of auxiliary power units 20, and a heat exchange element in the water heating device 230 transfers the heat of the circulating cooling water to air flow to be supplied to the cabin.

As mentioned above, the temperature sensor, which is arranged on each cooling loop and is not shown, can detect the cooling water temperature of the circulating cooling water in the corresponding cooling loop and provide the detected cooling water temperature value to the air-conditioning controller 210, so as to provide a control parameter for the control operation of the air-conditioning controller 210 as described below.

When it is required to supply hot air flow to the cabin according to a manual operation (manual-operated air-conditioner) of a passenger or according to an automatic judgment (automatically controlled air-conditioner) on air temperature in the cabin, the air-conditioning controller 210 can selectively turn on or off the electric heating device 220 and/or the water heating device 230 by means of the switch elements 121 and 131 shown in FIG. 1 according to the cooling water temperature of the cooling loops detected by the temperature sensors 140.

Specifically, according to the present invention, the water heating device 230 is turned on and the electric heating device 220 is turned off when the cooling water temperature in at least a preset number of cooling loops among the plurality of cooling loops reaches a preset temperature threshold, otherwise, the electric heating device 220 is turned on. The preset temperature threshold and the preset number may be set according to whether the water heating device 230 can meet the requirement of heat supply to the cabin by itself. The preset temperature threshold, for example, may be 80° C. or other appropriate temperature. When the cooling water temperature in a certain cooling loop reaches the preset temperature threshold, it indicates that the temperature of the circulating cooling water in the certain cooling loop reaches the working temperature of the water heating device 230.

However, it should be understood that in the series hybrid vehicle with the plurality of auxiliary power units 20 as shown in FIG. 2, the rated power of each auxiliary power unit 20 may roughly be 1/n of the rated power of a single auxiliary power unit in a traditional series hybrid vehicle having the same power demand, wherein n is the total number of the auxiliary power units 20. In this case, the power of each auxiliary power unit 20 is lower. It could be conceived that when the series hybrid vehicle has more (e.g. six or even eight) auxiliary power units 20 and the temperature of the circulating cooling water in only one cooling loop reaches the preset temperature threshold such as 80° C., the heat provided by the circulating cooling water in the single cooling loop may be insufficient to meet the heat supply demand of the whole vehicle. In this case, the water heating device 230 can supply heat by itself only when the temperature of the circulating cooling water in more cooling loops reaches the preset temperature threshold. The inventor of the present application discovers that the preset number of the cooling loops reaching the preset temperature threshold may be set as about one third or half of the total number of all the cooling loops, and such setting can realize sufficient heat supply while reducing the energy consumption as much as possible. In fact, in the situation that the engines of all the auxiliary power units have substantially same power, it is equivalent to that the temperature of the circulating cooling water in the engine cooling loops of the auxiliary power units of which the power is about one third or half of the total power of the engines of all the auxiliary power units reaches the preset temperature threshold. Since the total number of the cooling loops and the preset number are discrete natural numbers, "about" herein expresses that the preset number approaches (up or down) the preset proportion of the total number. For example, when the series hybrid vehicle has two or three auxiliary power units 20, the preset number may be one; when the series hybrid vehicle has four to six auxiliary power units 20, the preset number may be two or three, preferably two; and when the series hybrid vehicle has eight auxiliary power units 20, the preset number is preferably three.

In this way, according to the setting of the preset number and the preset temperature threshold above, when the temperature of the circulating cooling water in the cooling loops does not satisfy the condition that "the cooling water temperature in at least a preset number of cooling loops among the plurality of cooling loops reaches the preset temperature threshold", it indicates that the water heating device 230 is insufficient to meet the heat supply demand alone at the moment, then the electric heating device 220 is turned on, and the heat supply demand is rapidly met by using the advantage of high heating speed of the electric heating device 220. When the above-mentioned condition is satisfied, it indicates that the water heating device 230 can meet the heat supply demand by itself, then the water heating device 230 is turned on and the electric heating device 220 is turned off, and air is heated only by the waste heat of the circulating cooling water. Accordingly, the electricity consumption of the whole vehicle can be immediately reduced, the endurance mileage of the vehicle is ensured, deep electricity loss of the power battery is avoided, the power battery is protected and the service life of the power battery is prolonged.

When the electric heating device 220 works or is turned on, the air-conditioning controller 210 preferably turns off the water heating device 230. In this way, the circulating cooling water of the engine of each auxiliary power unit 20 may not flow through the water heating device 230 to dissipate heat, which contributes to the rapid temperature rise of the circulating cooling water of the engine to the preset temperature threshold, then the working time of the electric heating device 220 can be shortened, and the electricity consumption can be reduced.

When the water heating device 230 starts working, the air-conditioning controller 210 may turn on these cooling loops of which the cooling water temperature reaches the preset temperature threshold and turn off those cooling loops of which the cooling water temperature does not reach the preset temperature threshold, for example, by controlling the switch elements 131, so that the water heating device 230 only receives the circulating cooling water from the corresponding cooling loops of which the cooling water temperature reaches the preset temperature threshold, to avoid adverse effects on heat supply caused by the low-temperature circulating cooling water in the remaining cooling loops.

So far, the heating part of the air-conditioning system according to the present invention has been described with reference to FIG. 2. When the air-conditioning system according to the present invention uses the water heating device 230 for heating, it is allowable that a portion of the plurality of auxiliary power units 20 work and other auxiliary power units stop. When a hybrid vehicle with a single engine in the prior art (the power of which is substantially equivalent to the power sum of all the auxiliary power units in the present invention) uses a water heating device for heating, the single engine must be in a working state as a whole generally. By comparison, the air-conditioning system according to the present invention can meet the heat supply demand while reducing more energy consumption.

The refrigerating part of the air-conditioning system according to the present invention will be further described below with reference to FIG. 2. As shown in FIG. 2, the air-conditioning system may further include a mechanical air-conditioning compressor 250 for refrigerating. The air-conditioning compressor 250 may be in mechanical transmission connection with the engine of one selected auxiliary power unit 20' among the plurality of auxiliary power units 20, and is driven by the engine to run. The selected auxiliary power unit 20' may have a common working mode and a forced working mode. In the common working mode, the power controller 61 controls the engine of the selected auxiliary power unit 20' to selectively run or stop according to a preset control strategy. In the forced working mode, the power controller 61 controls the engine of the selected auxiliary power unit 20' to start running or constantly run and does not allow the engine to stop.

When cold air flow will be supplied to the cabin according to a manual operation of a passenger (manual-operated air-conditioner) or according to an automatic judgment on air temperature in the cabin (automatically controlled air-conditioner), or when the air-conditioning compressor 250 is required to work, the air-conditioning controller 210 may send an enabling instruction to the power controller 61. The power controller 61 controls the selected auxiliary power unit 20' to enter the forced working mode after receiving the enabling instruction. In this case, when the power controller 61 receives the enabling instruction and finds out that the engine of the selected auxiliary power unit 20' is in a stop state, it will force the engine of the selected auxiliary power unit 20' to start running, and the engine will drive the air-conditioning compressor 250 to run. When the power controller 61 receives the enabling instruction and finds out that the engine of the selected auxiliary power unit 20' is in a running state, it will keep the engine of the selected auxiliary power unit 20' in the running state and ignores other stop requirements of control strategies for example based on the power demand, that is to say, it does not allow the engine of the selected auxiliary power unit 20' to stop.

When cold air flow does not need to be supplied to the cabin or the air-conditioning compressor 250 does not need to work, the air-conditioning controller 210 may send a disabling instruction to the power controller 61. The power controller 61 controls the selected auxiliary power unit 20' to enter the common working mode when receiving the enabling instruction. In this case, the engine of the selected auxiliary power unit 20' may stop automatically or idly (idle stop mode) in response to other preset control strategy for example based on the power demand.

When the air-conditioning system according to the present invention uses the air-conditioning compressor 250 for refrigerating, the engine of the selected auxiliary power unit 20' can be forced to run and used as a driving source of the air-conditioning compressor 250, thus avoiding the situation that refrigeration cannot be realized because the engine of the selected auxiliary power unit 20' stops. On the one hand, the air-conditioning system according to the present invention can use the mechanical air-conditioning compressor with low cost; and on the other hand, when the selected auxiliary power unit 20' is in the forced working mode, other auxiliary power units 20 can still stop automatically or idly according to other preset control strategy for example based on the power demand. Thus, a satisfactory refrigerating effect can be achieved while the energy consumption is reduced.

As mentioned above, the output power of the engine in each auxiliary power unit 20 of the series hybrid vehicle may be for example about 18 kw. Thus, the single selected auxiliary power unit 20' already has the capability of driving the air-conditioning compressor 250. Of course, in other embodiments, if the power of the engine of the single auxiliary power unit 20' is insufficient to drive the air-conditioning compressor 250, more but not all the auxiliary power units 20 may be used as selected auxiliary power units 20' for simultaneously driving the air-conditioning compressor 250.

It should be understood that although the air-conditioning system in FIG. 2 simultaneously includes the heating part and the refrigerating part according to the present invention, the heating part and the refrigerating part according to the present invention may be independently implemented and work. That is to say, in some embodiments, the heating part of the air-conditioning system mentioned above can be adopted alone, while the refrigerating part adopts other solution different from the present invention; and in other embodiments, the refrigerating part of the air-conditioning system mentioned above can be adopted alone, while the heating part adopts other solution different from the present invention.

So far, those skilled in the art should appreciate that although multiple exemplary embodiments have been illustrated and described in detail, many other variations or modifications conforming to the principles of the present invention can be directly determined or derived from the disclosure of the present invention without departing from the spirit and scope of the present invention. Therefore, the scope of the present invention shall be understood and recognized as covering all of these other variations or modifications.

The invention claimed is:

1. An air-conditioning system for a series hybrid vehicle for selectively supplying required hot air flow or cold air flow to the series hybrid vehicle's cabin, wherein the series hybrid vehicle comprises a power system for driving the vehicle and the power system comprises:
   a main power unit including a power battery and a traction electromotor;
   a plurality of auxiliary power units, wherein each of the auxiliary power units respectively and independently receives fuel from a fuel source, converts chemical energy in the fuel into electric energy and outputs the electric energy to a common current bus, and each of auxiliary power units comprises an engine for converting the chemical energy in the fuel into mechanical energy and a generator for converting the mechanical energy of the engine into the electric energy; and a power controller for controlling the engine of each of the plurality of auxiliary power units to work according to a preset control strategy;

the air-conditioning system comprising:

an electric heating device having an electric heating element, which is configured for receiving the electric energy from the common current bus of the series hybrid vehicle, and converting the electric energy into heat energy by the electric heating element to heat air flow to be supplied to the cabin;

a water heating device having a heat exchange element, which is configured for receiving circulating cooling water respectively from a corresponding plurality of cooling loops of a corresponding plurality of engines of the plurality of auxiliary power units, and transferring heat of the circulating cooling water by the heat exchange element to the air flow to be supplied to the cabin;

temperature sensors each of which is arranged at a corresponding cooling loop for detecting the cooling water temperature of the circulating cooling water in the corresponding cooling loop; and an air-conditioning controller configured, in the case of supplying the hot air flow to the cabin, to selectively turn on or off the electric heating device and/or the water heating device according to the cooling water temperature detected by the temperature sensors; wherein the water heating device is turned on and the electric heating device is turned off when the cooling water temperature in at least a preset number of cooling loops among the plurality of cooling loops reaches a preset temperature threshold, otherwise, the electric heating device is turned on.

2. The air-conditioning system according to claim 1, wherein each of the plurality of cooling loops is respectively provided with a switch element for selectively turning on or off water supply to the water heating device; and the air-conditioning controller is further configured to control the switch elements when the water heating device is turned on, so that the water heating device only receives the circulating cooling water from the corresponding cooling loops of which the cooling water temperature reaches the preset temperature threshold.

3. The air-conditioning system according to claim 1, wherein the air-conditioning controller is further configured to turn off the water heating device when the electric heating device is turned on.

4. The air-conditioning system according to claim 1, wherein the preset number is one.

5. The air-conditioning system according to claim 1, wherein the preset number is about one third or half of the total number of the plurality of cooling loops.

6. The air-conditioning system according to claim 1, further comprising:

selected auxiliary power unit(s) which are a portion of the plurality of auxiliary power units, wherein each of the selected auxiliary power units has a common working mode and a forced working mode; in the common working mode, the power controller selectively controls the engines of the selected auxiliary power units to run or stop according to the preset control strategy; in the forced working mode, the power controller controls the engines of the selected auxiliary power units to start running or constantly run without stopping; and a mechanical compressor for refrigerating, which is in mechanical transmission connection with the engines of the selected auxiliary power units and driven by the engines to run;

wherein the air-conditioning controller is further configured to send an enabling instruction to the power controller when it is required to supply the cold air flow to the cabin, and in response to the received enabling instruction, the power controller controls the selected auxiliary power units to enter the forced working mode.

7. The air-conditioning system according to claim 6, wherein the air-conditioning controller is further configured to send a disabling instruction to the power controller when it is not required to supply the cold air flow to the cabin, and in response to the received disabling instruction, the power controller controls the selected auxiliary power units to enter the common working mode.

8. The air-conditioning system according to claim 6, wherein the number of the portion of the plurality of auxiliary power units is one.

9. A series hybrid vehicle comprising a power system for driving the vehicle and an air-conditioning system for regulating a cabin temperature;

wherein the power system comprises:

a main power unit including a power battery and a traction electromotor;

a plurality of auxiliary power units, wherein each of the auxiliary power units respectively and independently receives fuel from a fuel source, converts chemical energy in the fuel into electric energy and outputs the electric energy to a common current bus, and each of the auxiliary power units comprises an engine for converting the chemical energy in the fuel into mechanical energy and a generator for converting the mechanical energy of the engine into the electric energy; and a power controller for controlling the engine of each of the plurality of auxiliary power units to work according to a preset control strategy; wherein a number of the plurality of auxiliary power units are selected auxiliary power units, and each of the selected auxiliary power units has a common working mode and a forced working mode;

in the common working mode, the power controller selectively controls the engine of the selected auxiliary power unit to run or stop according to the preset control strategy; in the forced working mode, the power controller controls the engine of the selected auxiliary power unit to start running or constantly run without stopping; and wherein the air-conditioning system comprises:

a mechanical compressor, which is in mechanical transmission connection with the engines of the selected auxiliary power units and driven by the engines to run; and an air-conditioning controller configured to send an enabling instruction to the power controller when the mechanical compressor is required to work; wherein the power controller controls the selected auxiliary power units to enter the forced working mode in response to the received enabling instruction.

10. The series hybrid vehicle according to claim 9, wherein the air-conditioning controller is further configured to send a disabling instruction to the power controller when the mechanical compressor is not required to work; and in response to the received disabling instruction, the power controller controls the selected auxiliary power units to enter the common working mode.

11. The series hybrid vehicle according to claim 9, wherein the number of the selected auxiliary power units is one.

* * * * *